(12) United States Patent
Yavuz et al.

(10) Patent No.: US 8,718,696 B2
(45) Date of Patent: May 6, 2014

(54) TRANSMIT POWER SELECTION FOR USER EQUIPMENT COMMUNICATING WITH FEMTO CELLS

(75) Inventors: Mehmet Yavuz, San Diego, CA (US); Sanjiv Nanda, Ramona, CA (US); Yeliz Tokgoz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 443 days.

(21) Appl. No.: 12/463,705

(22) Filed: May 11, 2009

(65) Prior Publication Data

US 2009/0286545 A1     Nov. 19, 2009

Related U.S. Application Data

(60) Provisional application No. 61/052,930, filed on May 13, 2008.

(51) Int. Cl.
*H04B 7/00* (2006.01)

(52) U.S. Cl.
USPC ........... 455/522; 455/500; 455/528; 370/252; 370/328

(58) Field of Classification Search
USPC .......... 455/500–528, 62, 452.1; 370/252, 328
See application file for complete search history.

(56) References Cited

U.S. PATENT DOCUMENTS

| | | | |
|---|---|---|---|
| 5,396,516 A | 3/1995 | Padovani et al. | |
| 5,606,727 A | 2/1997 | Ueda | |
| 5,832,378 A | 11/1998 | Zicker et al. | |
| 5,839,063 A | 11/1998 | Lee | |
| 5,884,145 A | 3/1999 | Haartsen | |
| 6,223,031 B1 | 4/2001 | Naslund | |
| 6,643,520 B1 | 11/2003 | Park et al. | |

(Continued)

FOREIGN PATENT DOCUMENTS

| | | |
|---|---|---|
| CN | 1497888 A | 5/2004 |
| CN | 1513275 A | 7/2004 |

(Continued)

OTHER PUBLICATIONS

"3rd Generation Partnership Project; Technical Specification Group Radio Access Network; Evolved Universal Terrestrial Radio Access (E-UTRA); User Equipment (UE) procedures in idle mode (Release 8); 3GPP TS 36.304 V8.1 .0" 3rd Generation Partnership Project (3GPP), Mar. 1, 2008.

(Continued)

*Primary Examiner* — Lam T Mai

(57) ABSTRACT

Transmit power for a user equipment (UE) is set by a Home NodeB (HNB) in response to interference at a nearby macrocell. The HNB monitors an interference level to the macrocell from a UE communicating with the HNB. An acceptable transmit power for the UE is determined by the HNB in response to the interference level. A power change indicator is transmitted from the HNB to the UE to adjust the transmit power of the UE. In some cases, the interference may be estimated from a busy indicator from the macrocell and the HNB sends a modified version of the busy indicator to the UE to adjust the transmit power of the UE. In other cases, the HNB estimates a path loss for the UE based on received signal power from the macrocell and signals a transmit power change to the UE, if needed, based on the estimated path loss.

25 Claims, 11 Drawing Sheets

(56) References Cited

U.S. PATENT DOCUMENTS

| | | |
|---|---|---|
| 7,512,379 B2 | 3/2009 | Nguyen |
| 2002/0160798 A1 | 10/2002 | Shoji et al. |
| 2003/0161268 A1 | 8/2003 | Larsson et al. |
| 2004/0127191 A1 | 7/2004 | Matsunaga |
| 2004/0132410 A1 | 7/2004 | Hundal et al. |
| 2005/0148368 A1 | 7/2005 | Scheinert et al. |
| 2006/0089141 A1 | 4/2006 | Ho et al. |
| 2006/0099987 A1 | 5/2006 | Singh et al. |
| 2006/0183481 A1 | 8/2006 | Furukawa et al. |
| 2006/0209764 A1 | 9/2006 | Kim et al. |
| 2007/0047493 A1 | 3/2007 | Park et al. |
| 2007/0047494 A1 | 3/2007 | Cordone |
| 2007/0097939 A1 | 5/2007 | Nylander et al. |
| 2007/0105574 A1 | 5/2007 | Gupta et al. |
| 2007/0238448 A1 | 10/2007 | Gallagher et al. |
| 2008/0057934 A1 | 3/2008 | Sung et al. |
| 2008/0076425 A1 | 3/2008 | Khetawat et al. |
| 2008/0102877 A1 | 5/2008 | Suemitsu et al. |
| 2009/0042595 A1 | 2/2009 | Yavuz et al. |
| 2009/0042596 A1 | 2/2009 | Yavuz et al. |
| 2009/0052395 A1 | 2/2009 | Bao et al. |
| 2009/0061873 A1 | 3/2009 | Bao et al. |
| 2009/0111499 A1 | 4/2009 | Bosch et al. |
| 2009/0135790 A1 | 5/2009 | Yavuz et al. |
| 2009/0252088 A1 | 10/2009 | Rao et al. |
| 2009/0258644 A1 | 10/2009 | Osborn |
| 2009/0280819 A1 | 11/2009 | Brisebois et al. |
| 2009/0285113 A1 | 11/2009 | Yavuz et al. |
| 2009/0285172 A1 | 11/2009 | Hansen et al. |
| 2009/0286496 A1 | 11/2009 | Yavuz et al. |
| 2009/0286545 A1* | 11/2009 | Yavuz et al. ............... 455/452.1 |
| 2010/0118801 A1 | 5/2010 | Yavuz et al. |
| 2010/0151870 A1 | 6/2010 | Piercy et al. |
| 2010/0323663 A1 | 12/2010 | Vikberg et al. |
| 2011/0003597 A1 | 1/2011 | Budic et al. |
| 2011/0021240 A1* | 1/2011 | Hiltunen et al. ............. 455/522 |
| 2011/0028170 A1* | 2/2011 | Sawai ............................ 455/501 |
| 2011/0028179 A1* | 2/2011 | Sawai et al. .................. 455/522 |
| 2011/0110254 A1* | 5/2011 | Ji et al. ........................ 370/252 |

FOREIGN PATENT DOCUMENTS

| | | |
|---|---|---|
| CN | 1894979 A | 1/2007 |
| CN | 101040476 A | 9/2007 |
| CN | 101052193 A | 10/2007 |
| CN | 101128994 A | 2/2008 |
| EP | 1638247 A1 | 3/2006 |
| EP | 1806651 A2 | 7/2007 |
| EP | 1806851 A2 | 7/2007 |
| EP | 1843618 | 10/2007 |
| GB | 2266433 A | 10/1993 |
| JP | 2001238252 A | 8/2001 |
| JP | 2001513970 A | 9/2001 |
| JP | 2002536905 A | 10/2002 |
| JP | 2004207839 A | 7/2004 |
| JP | 2007266785 A | 10/2007 |
| JP | 2007529915 A | 10/2007 |
| JP | 2008061250 A | 3/2008 |
| JP | 2008098869 A | 4/2008 |
| RU | 2114508 C1 | 6/1998 |
| RU | 2168871 C2 | 6/2001 |
| RU | 2232484 C2 | 7/2004 |
| RU | 2304853 C2 | 8/2007 |
| TW | 200812352 A | 3/2008 |
| WO | 0008706 A2 | 2/2000 |
| WO | WO-0046929 A1 | 8/2000 |
| WO | 2005015917 A2 | 2/2005 |
| WO | WO2006007318 A1 | 1/2006 |
| WO | WO2006010958 A2 | 2/2006 |
| WO | 2006079689 A1 | 8/2006 |
| WO | WO2006091172 A1 | 8/2006 |
| WO | 2006117838 A1 | 11/2006 |
| WO | 2007024895 A2 | 3/2007 |
| WO | 2007040449 A1 | 4/2007 |
| WO | WO2008025874 A1 | 3/2008 |
| WO | 2009039404 | 3/2009 |

OTHER PUBLICATIONS

"3rd Generation Partnership Project; Technical Specification Group Radio Access Networks; 3G Home Nodeb Study Item Technical Report (Release 8); 3GPP TR 25.820 V8.0.0"3RD Generation Partnership Project (3GPP), Mar. 1, 2008, pp. 1-37.

Claussen H et al: "An overview of the femtocell concept" Bell Labs Technical Journal, Wiley, CA, US, vol. 1, No. 13, Mar. 21, 2008, pp. 221-245, XP001512256 ISSN: 1089-7089 abstract p. 224, left-hand column—p. 225, left-hand column p. 227, paragraphs Auto-Configuration,Downlink,Uplink figure 2.

International Search Report and Written Opinion—PCT/US2009/043674, International Search Authority—European Patent Office—Mar. 2, 2010.

Patrick Agyapong et al: "Interference Tolerance Signaling Using TDD Busy Tone Concept" Vehicular Technology Conference, 2007. VTC2007-Spring. IEEE 65TH, IEEE, PI, Apr. 1, 2007, pp. 2850-2854, XP031093151. ISBN: 978-1-4244-0266-3.

Vikram Chandrasekhar et al: "Uplink Capacity and Interference Avoidance for Two-Tier Cellular Networks" Global Telecommunications Conference, 2007. Globecom '07. IEEE, Piscataway, NJ, USA, Nov. 1, 2007, pp. 3322-3326, XP031196558.

Ericsson, "Home Node B output power", R4-070969, 3GPP TSG-RAN Working Group 4 (Radio) meeting #43bis Orlando, USA, Jun. 25-29, 2007.

Fan et al., "Interference Management in Femto Cell Deployment", 3GPP2, S00-FEMTO-20071015-025_QCOM Femto Interference Management, Oct. 15, 2007.

Taiwan Search Report—TW098115885—TIPO—Mar. 27, 2013.

European Search Report—EP13164301—Search Authority—The Hague—May 22, 2013.

* cited by examiner

US 8,718,696 B2

TRANSMIT POWER SELECTION FOR USER EQUIPMENT COMMUNICATING WITH FEMTO CELLS

CLAIM OF PRIORITY UNDER 35 U.S.C. §119

This application claims the benefit of and priority to commonly owned U.S. Provisional Patent Application No. 61/052,930, filed May 13, 2008, and assigned which is hereby incorporated by reference herein.

REFERENCE TO CO-PENDING APPLICATIONS FOR PATENT

This application is related to concurrently filed and commonly owned: U.S. patent application Ser. No. 12/463,695, entitled "Autonomous Carrier Selection for Femto Cells," and U.S. patent application Ser. No. 12/463,701, entitled "Autonomous Downlink Code Selection for Femto Cells," the disclosures of which are hereby incorporated by reference herein.

BACKGROUND

1. Field

This application relates generally to wireless communication and more specifically, but not exclusively, to improving communication performance.

2. Background

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance.

To supplement the base stations of a conventional mobile phone network (e.g., a macro cellular network), small-coverage base stations may be deployed, for example, in a user's home. Such small-coverage base stations are generally known as access point base stations, home NodeBs, or femto cells and may be used to provide more robust indoor wireless coverage to mobile units. Typically, such small-coverage base stations are connected to the Internet and the mobile operator's network via a Digital Subscriber Line (DSL) router or a cable modem.

In a typical macro cellular deployment the RF coverage is planned and managed by cellular network operators to optimize coverage between macro base stations. Femto base stations, on the other hand, may be installed by the subscriber personally and deployed in an ad-hoc manner. Consequently, femto cells may cause interference both on the uplink (UL) and downlink (DL) of the macro cells. For example, a femto base station installed near a window of a residence may cause significant downlink interference to any access terminals outside the house that are not served by the femto cell. Also, on the uplink, home access terminals that are served by a femto cell may cause interference at a macro cell base station (e.g., macro NodeB).

Femto cells also may interfere with one another and macrocells as a result of unplanned deployment. For example, in a multi-resident apartment, a femto base station installed near a wall separating two residences may cause significant interference to a femto base station in a neighboring residence. Here, the strongest femto base station seen by a home access terminal (e.g., strongest in terms of RF signal strength received at the access terminal) may not necessarily be the serving base station for the access terminal due to a restricted association policy enforced by that femto base station.

Thus, interference issues may arise in a communication system where radio frequency (RF) coverage of femto base stations is not optimized by the mobile operator and where deployment of such base stations is ad-hoc. Consequently, there is a need for improved interference management for wireless networks.

Figure 1:
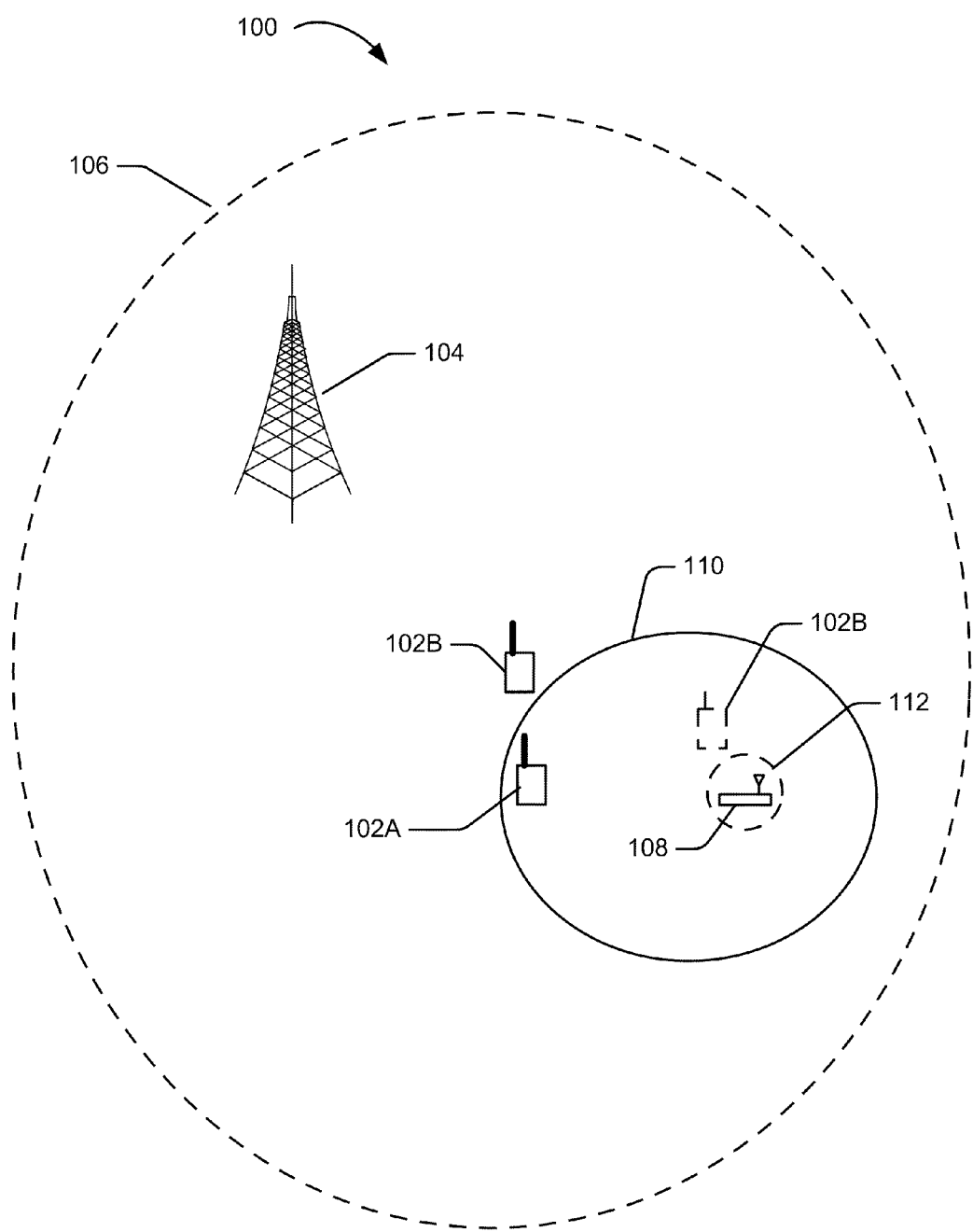
FIG. 1 is a simplified diagram of several sample aspects of a communication system including macro coverage and smaller scale coverage.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. In addition, like reference numerals may be used to denote like features throughout the specification and figures.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

Various embodiments of the disclosure are described below. It should be apparent that the teachings herein may be embodied in a wide variety of forms and that any specific structure, function, or both being disclosed herein is merely representative. Based on the teachings herein one skilled in the art should appreciate that an embodiment disclosed herein may be implemented independently of any other embodiments and that two or more of these embodiments may be combined in various ways. For example, an apparatus may be implemented, or a method may be practiced, using any number of the embodiments set forth herein. In addition, such an apparatus may be implemented, or such a method may be practiced, using other structure, functionality, or structure and functionality in addition to or other than one or more of the embodiments set forth herein.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, High-Speed Downlink Packet Access (HSDPA) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMQ®, etc.

UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems.

LTE is a release of UMTS that uses E-UTRA.

Although certain embodiments of the disclosure may be described using 3GPP terminology, it is to be understood that the teachings herein may be applied to 3GPP (Re199, Re15, Re16, Re17) technology, as well as 3GPP2 (IxRTT, 1xEV-DO RelO, RevA, RevB) technology and other technologies.

FIG. 1 illustrates a network system 100 that includes macro scale coverage (e.g., a large area cellular network such as a 3G network, which may be commonly referred to as a macro cell network) and smaller scale coverage (e.g., a residence-based or building-based network environment). As a node such as access terminal 102A moves through the network, the access terminal 102A may be served in certain locations by macro access nodes 104 (also referred to herein as macro nodes) that provide macro coverage as represented by a macro coverage area 106 while the access terminal 102A may be served at other locations by small scale access nodes 108 (also referred to herein as small scale nodes) that provide smaller scale coverage as represented by the small scale coverage area 110. In some aspects, the small scale nodes 108 may be used to provide incremental capacity growth, in-building coverage, and different services (e.g., for a more robust user experience).

As will be discussed in more detail below, the small scale access node 108 may be restricted in that it may not provide certain services to certain nodes (e.g., a visitor access terminal 102B). As a result, a coverage hole may be created in the macro coverage area 106.

The size of the coverage hole may depend on whether the macro access node 104 and the small scale node 108 are operating on the same frequency carrier. For example, when the nodes 104 and 108 are on a co-channel (e.g., using the same frequency carrier), the coverage hole may correspond closely to the small scale coverage area 110. Thus, in this case the access terminal 102B may lose macro coverage when it is within the small scale coverage area 110 (e.g., as indicated by the phantom view of the access terminal 102B).

A small scale node 108 may be, for example, a femto node or a pico node. A femto node may be an access node that has a limited coverage area, such as for example a home or apartment. A node that provides coverage over an area that is smaller than a macro area and larger than a femto area may be referred to as a pico node (e.g., providing coverage within a commercial building). It should be appreciated that the teachings herein may be implemented with various types of nodes and systems. For example, a pico node or some other type of node may provide the same or similar functionality as a femto node for a different (e.g., larger) coverage area. Thus, as discussed more fully below, like a femto node, a pico node may be restricted, a pico node may be associated with one or more home access terminals, and so on.

When the nodes 104 and 108 are on adjacent channels (e.g., using different frequency carriers), a smaller coverage hole 112 may be created in the macro coverage area 106 as a result of adjacent channel interference from the small scale node 108.

Thus, when the access terminal 102A is operating on an adjacent channel, the access terminal 102A may receive macro coverage at a location that is closer to the small scale node 108 (e.g., just outside the smaller coverage hole 112).

Depending on system design parameters, the co-channel coverage hole may be relatively large. For example, if the interference of the small scale node 108 is at least as low as the thermal noise floor, the coverage hole may have a radius on the order of 40 meters for a CDMA system where the transmit power of the small scale node 108 is 0 dBm, assuming free space propagation loss and a worst case where there is no wall separation between the small scale node 108 and access terminal 102B.

A tradeoff thus exists between minimizing the outage in the macro coverage area 106 while maintaining adequate coverage within a designated smaller scale environment (e.g., femto node 108 coverage inside a home). For example, when a restricted femto node 108 is at the edge of the macro coverage area 106, as a visiting access terminal approaches the femto node 108, the visiting access terminal is likely to lose macro coverage and drop the call. In such a case, one solution for the macro cellular network would be to move the visitor access terminal to another carrier (e.g., where the adjacent channel interference from the femto node is small). Due to limited spectrum available to each operator, however, the use of separate carrier frequencies may not always be practical. In any event, another operator may be using the carrier used by the femto node 108. Consequently, a visitor access terminal associated with that other operator may suffer from the coverage hole created by the restricted femto node 108 on that carrier.

Figure 2:
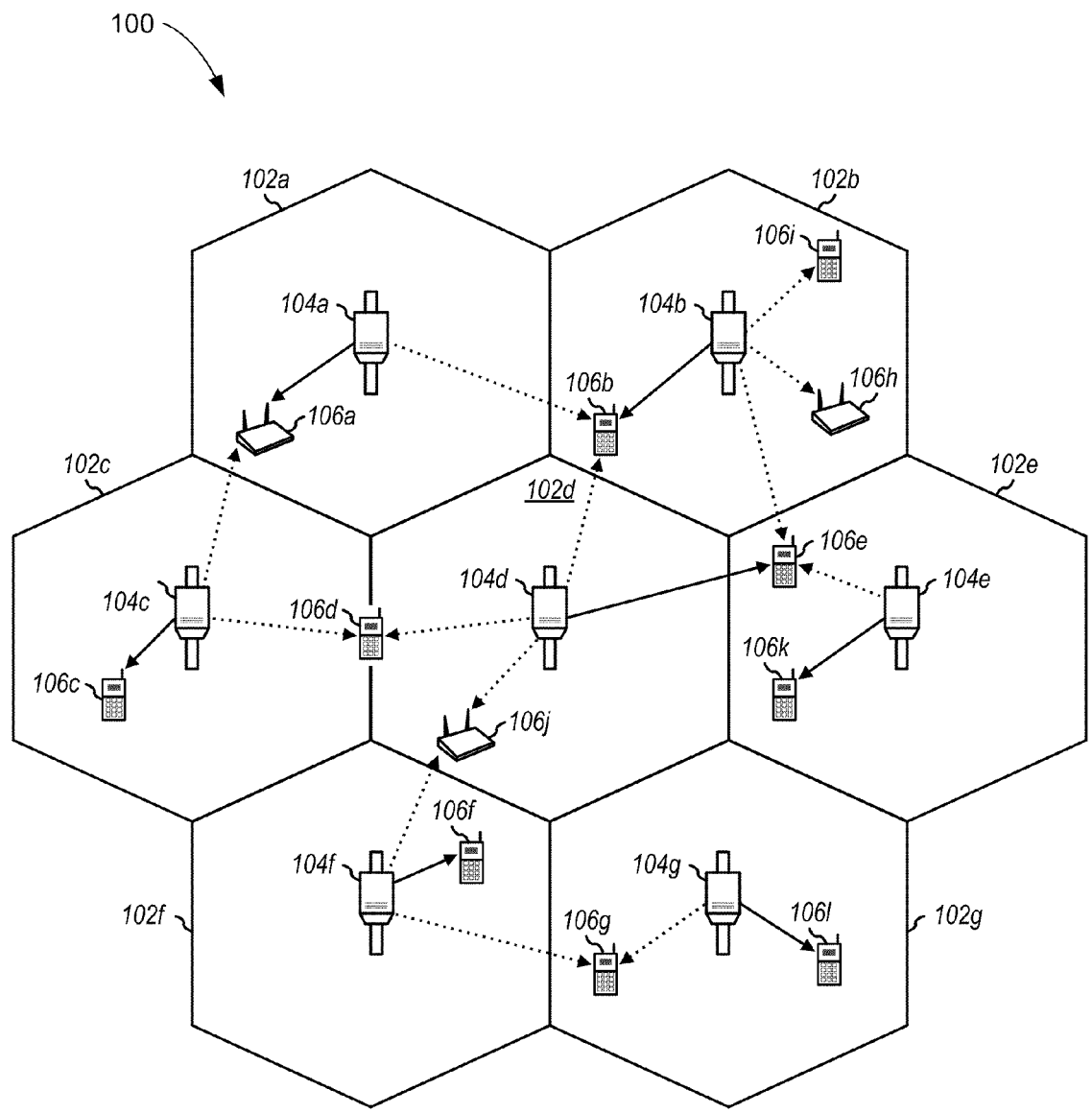
FIG. 2 is another representation of the wireless communication system configured to support a number of users, in which various disclosed embodiments and aspects may be implemented.

FIG. 2 illustrates another representation of the wireless communication system 100 configured to support a number of users, in which various disclosed embodiments and aspects may be implemented. As shown in FIG. 2, by way of example, wireless communication system 100 provides communication for multiple cells 102, such as, for example, macro cells 102A-102G, with each cell being serviced by a corresponding access point (AP) 104 (such as APs 104A-104G). Each cell may be further divided into one or more sectors. Various access terminals (ATs) 106 (e.g., ATs 106A-106K) also known interchangeably as user equipment (UE), are dispersed throughout the system. Each AT 106 may communicate with one or more APs 104 on a forward link (FL) and/or a reverse link (RL) at a given moment, depending upon whether the AT is active and whether it is in soft handoff, for example. The wireless communication system 100 may provide service over a large geographic region, for example, macro cells 102A-102G may cover a few blocks in a neighborhood.

In various applications, other terminology may be used to reference a macro node 104, a femto node 108, or a pico node. For example, a macro node 104 may be configured or referred to as an access node, base station, access point, eNodeB, macro cell, macro NodeB (MNB), and so on. Also, a femto node 108 may be configured or referred to as a home NodeB (HNB), home eNodeB, access point base station, femto cell, and so on. Also, a cell associated with a macro node, a femto node, or a pico node may be referred to as a macro cell, a femto cell, or a pico cell, respectively.

As mentioned above, a femto node 108 may be restricted in some aspects. For example, a given femto node 108 may only provide service to a limited set of access terminals 106. Thus, in deployments with so-called restricted (or closed) association, a given access terminal 106 may be served by the macro cell mobile network and a limited set of femto nodes 108 (e.g., femto nodes that reside within a corresponding user residence).

The restricted provisioned set of access terminals 106 associated with a restricted femto node 108 (which may also be referred to as a Closed Subscriber Group Home NodeB) may be temporarily or permanently extended as necessary. In some aspects, a Closed Subscriber Group (CSG) may be defined as the set of access nodes (e.g., femto nodes) that share a common access control list of access terminals. In some implementations, all femto nodes (or all restricted femto nodes) in a region may operate on a designated channel, which may be referred to as the femto channel.

Various relationships may be defined between a restricted femto node and a given access terminal. For example, from the perspective of an access terminal, an open femto node may refer to a femto node with no restricted association. A restricted femto node may refer to a femto node that is restricted in some manner (e.g., restricted for association and/or registration). A home femto node may refer to a femto node on which the access terminal is authorized to access and operate. A guest femto node may refer to a femto node on which an access terminal is temporarily authorized to access or operate. An alien femto node may refer to a femto node on which the access terminal is not authorized to access or operate, except for perhaps emergency situations (e.g., 911 calls).

From the perspective of a restricted femto node, a home access terminal (or home user equipment, "HUE") may refer to an access terminal that is authorized to access the restricted femto node. A guest access terminal may refer to an access terminal with temporary access to the restricted femto node. An alien access terminal may refer to an access terminal that does not have permission to access the restricted femto node, except for perhaps emergency situations such as 911 calls. Thus, in some aspects an alien access terminal may be defined as one that does not have the credentials or permission to register with the restricted femto node. An access terminal that is currently restricted (e.g., denied access) by a restricted femto cell may be referred to herein as a visitor access terminal. A visitor access terminal may thus correspond to an alien access terminal and, when service is not allowed, a guest access terminal.

Figure 3:
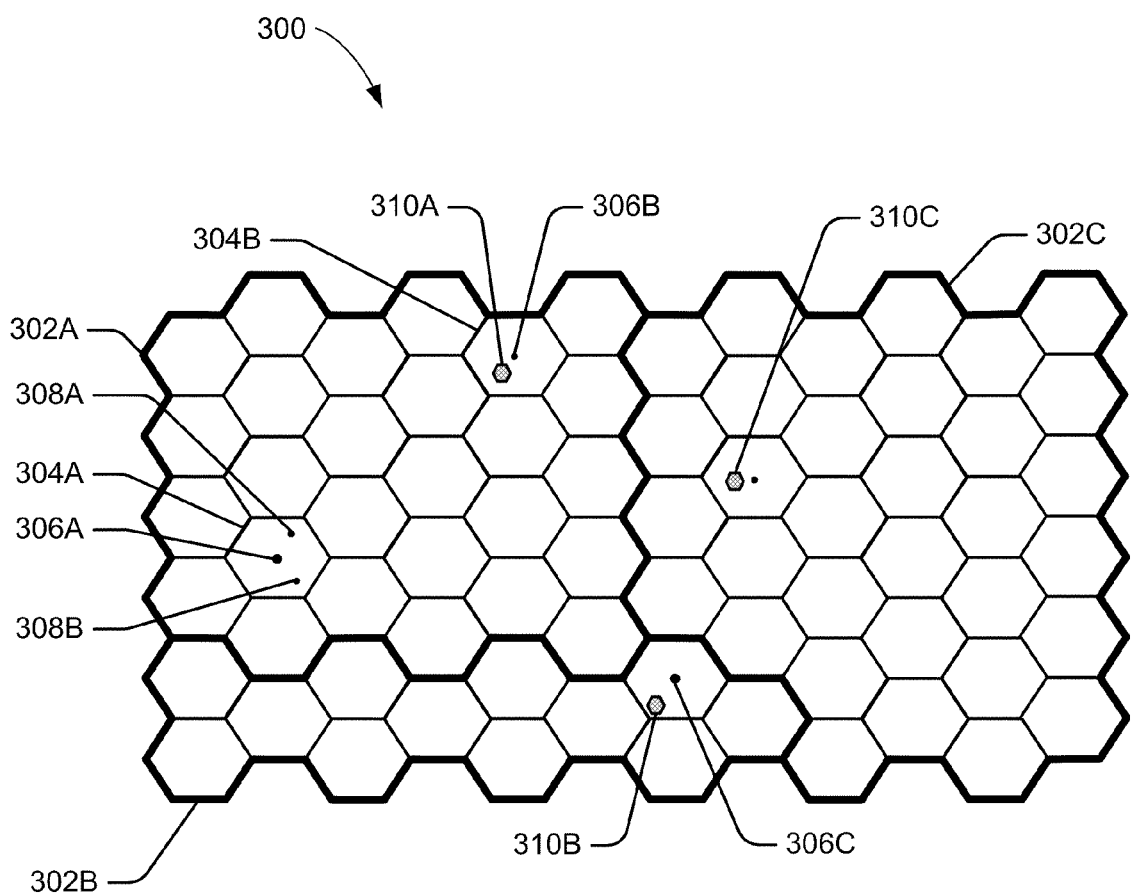
FIG. 3 is a simplified diagram illustrating coverage areas for wireless communication.

FIG. 3 illustrates an example of a coverage map 300 for a network where several tracking areas 302 (or routing areas or location areas) are defined. Specifically, areas of coverage associated with tracking areas 302A, 302B, and 302C are delineated by the wide lines in FIG. 3.

The system provides wireless communication via multiple cells 304 (represented by the hexagons), such as, for example, macro cells 304A and 304B, with each cell being serviced by a corresponding access node 306 (e.g., access nodes 306A-306C). As shown in FIG. 3, access terminals 308 (e.g., access terminals 308A and 308B) may be dispersed at various locations throughout the network at a given point in time. Each access terminal 308 may communicate with one or more access nodes 306 on a forward link (FL) and/or a reverse link (RL) at a given moment, depending upon whether the access terminal 308 is active and whether it is in soft handoff, for example.

The tracking areas 302 also include femto coverage areas 310. In this example, each of the femto coverage areas 310 (e.g., femto coverage area 310A-310C) is depicted within a macro coverage area 304 (e.g., macro coverage area 304B). It should be appreciated, however, that a femto coverage area 310 may not lie entirely within a macro coverage area 304. In practice, a large number of femto coverage areas 310 may be defined with a given tracking area 302 or macro coverage area 304. Also, one or more pico coverage areas (not shown) may be defined within a given tracking area 302 or macro coverage area 304. To reduce the complexity of FIG. 3, only a few access nodes 306, access terminals 308, and femto nodes are shown.

Figure 4:
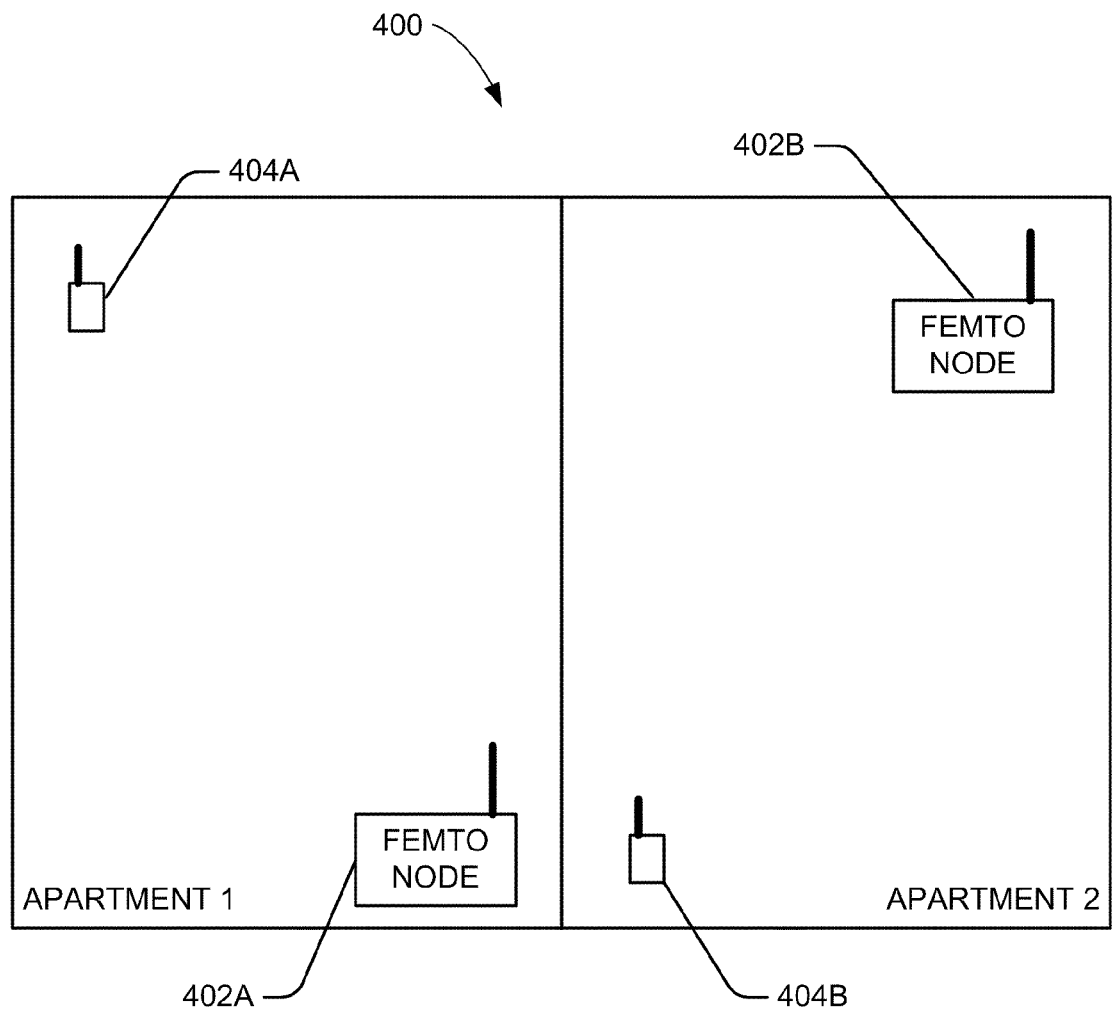
FIG. 4 is a simplified diagram of several sample aspects of a communication system including neighboring femto cells.

FIG. 4 illustrates a network 400 where femto nodes 402 are deployed in an apartment building. Specifically, a femto node 402A is deployed in apartment 1 and a femto node 402B is deployed in apartment 2 in this example. The femto node 402A is the home femto for an access terminal 404A. The femto node 402B is the home femto for an access terminal 404B.

As illustrated in FIG. 4, for the case where the femto nodes 402A and 402B are restricted, each access terminal 404 (e.g., 404A and 404B) may only be served by its associated (e.g., home) femto node 402. In some cases, however, restricted association may result in negative geometry situations and outages of femto nodes. For example, in FIG. 4 the femto node 402A is closer to the access terminal 404B than the femto node 402B and may therefore provide a stronger signal at the access terminal 404B. As a result, the femto node 402A may unduly interfere with reception at the access terminal 404B. Such a situation may thus affect the coverage radius around the femto node 402B at which an associated access terminal 404 may initially acquire the system and remain connected to the system.

Figure 5:
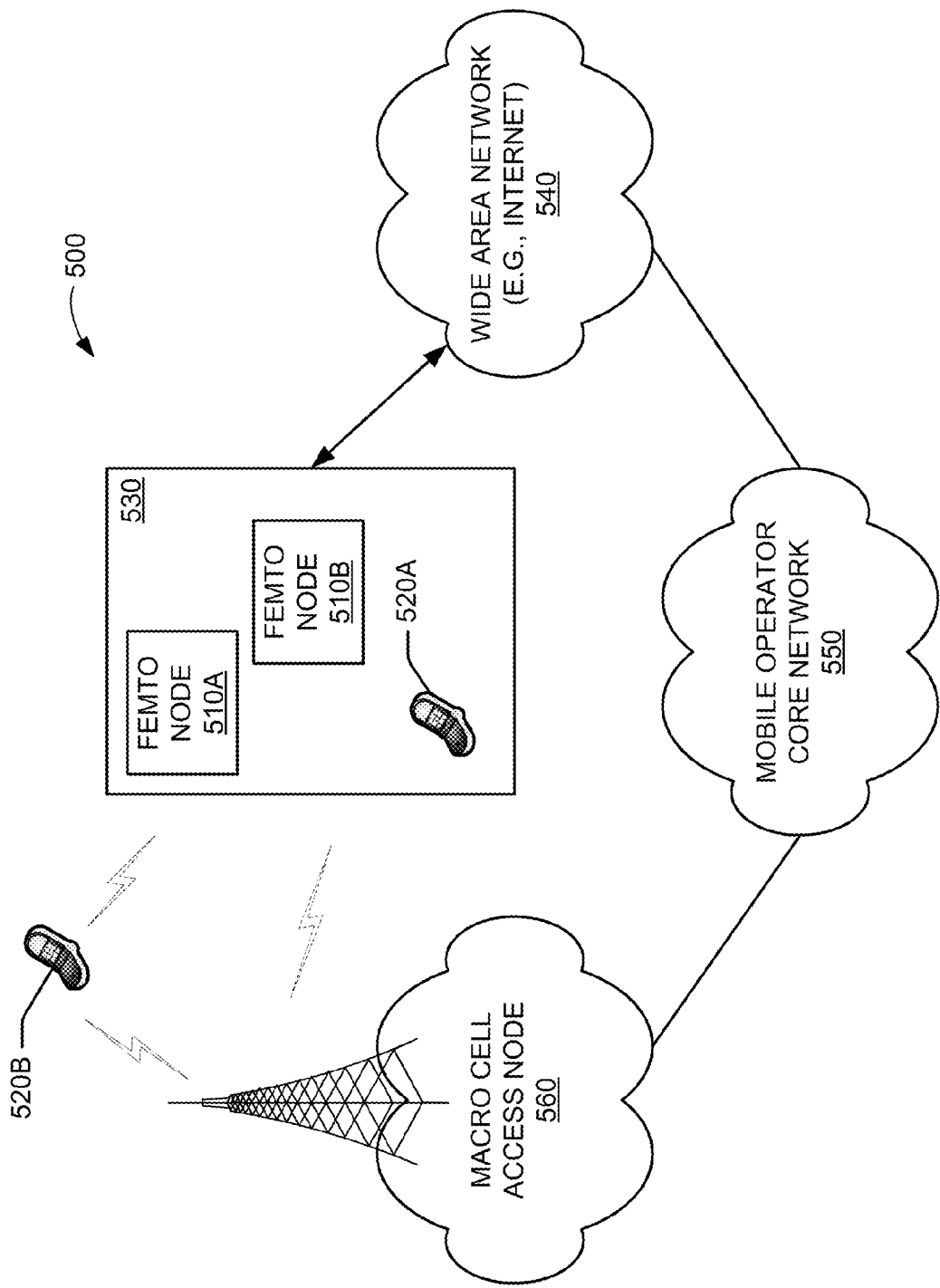
FIG. 5 is a simplified diagram of a wireless communication system including femto nodes.

FIG. 5 illustrates an exemplary communication system 500 where one or more femto nodes are deployed within a network environment. Connectivity for a femto node environment may be established in various ways within this communication system 500. Specifically, the system 500 includes multiple femto nodes 510 (e.g., femto nodes 510A and 510B) installed in a relatively small scale network environment (e.g., in one or more user residences 530). Each femto node 510 may be coupled to a wide area network 540 (e.g., the Internet) and a mobile operator core network 550 via a DSL router, a cable modem, a wireless link, or other connectivity means (not shown). As discussed herein, each femto node 510 may be configured to serve associated access terminals 520 (e.g., access terminal 520A) and, optionally, other access terminals 520 (e.g., access terminal 520B). In other words, access to femto nodes 510 may be restricted whereby a given access terminal 520 may be served by a set of designated (e.g., home) femto nodes 510 but may not be served by any non-designated femto nodes 510 (e.g., a neighbor's femto node 510). Access terminals 520 also may be referred to herein as User Equipment 520 (UEs). Femto nodes 510 also may be referred to herein as Home NodeBs (HNBs).

The owner of a femto node 510 may subscribe to mobile service, such as, for example, 3G mobile service offered through the mobile operator core network 550. In addition, an access terminal 520 may be capable of operating both in macro environments and in smaller scale (e.g., residential) network environments. In other words, depending on the current location of the access terminal 520, the access terminal 520 may be served by an access node 560 of the macro cell mobile network 550 or by any one of a set of femto nodes 510 (e.g., the femto nodes 510A and 510B that reside within a corresponding user residence 530). For example, when a subscriber is outside his home, he may be served by a standard macro access node (e.g., node 560) and when the subscriber is at home, he is served by a femto node (e.g., node 510A). Here, it should be appreciated that a femto node 510 may be backward compatible with existing access terminals 520.

In embodiments described herein, the owner of the femto node 510 subscribes to mobile service, such as, for example, 3G mobile service, offered through the mobile operator core network 550, and the UE 520 is capable to operate both in macro cellular environment and in residential small scale network environment.

A home femto node is a base station on which an AT or UE is authorized to operate. A guest femto node refers to a base station on which an AT or UE is temporarily authorized to operate on, and an alien femto node is a base station on which the AT or UE is not authorized to operate on.

A femto node 510 may be deployed on a single frequency or, in the alternative, on multiple frequencies. Depending on the particular configuration, the single frequency or one or more of the multiple frequencies may overlap with one or more frequencies used by a macro node (e.g., node 560).

An access terminal 520 may be configured to communicate either with the macro network 550 or the femto nodes 510, but not both simultaneously. In addition, an access terminal 520 being served by a femto node 510 may not be in a soft handover state with the macro network 550.

In some aspects, an access terminal 520 may be configured to connect to a preferred femto node (e.g., the home femto node of the access terminal 520) whenever such connectivity is possible. For example, whenever the access terminal 520 is within the user's residence 530, it may be desired that the access terminal 520 communicate only with the home femto node 510.

In some aspects, if the access terminal 520 operates within the macro cellular network 550 but is not residing on its most preferred network (e.g., as defined in a preferred roaming list), the access terminal 520 may continue to search for the most preferred network (e.g., the preferred femto node 510) using a Better System Reselection (BSR), which may involve a periodic scanning of available systems to determine whether better systems are currently available, and subsequent efforts to associate with such preferred systems. With the acquisition entry, the access terminal 520 may limit the search for specific band and channel. For example, the search for the most preferred system may be repeated periodically. Upon discovery of a preferred femto node 510, the access terminal 520 may select the preferred femto node 510 for camping within its coverage area.

The teachings herein may be employed in a wireless multiple-access communication system that simultaneously supports communication for multiple wireless access terminals. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out system, a multiple-in-multiple-out (MIMO) system, or some other type of system.

A MIMO system employs multiple transmit antennas (NT) and multiple receive antennas (NR) for data communication. A MIMO channel formed by the NT transmit and NR receive antennas may be decomposed into multiple independent channels (NS), which are also referred to as spatial channels, where $NS \leq \min\{NT, NR\}$. Each of the NS independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point. The teachings herein may be incorporated into a node (e.g., a device) employing various components for communicating with at least one other node.

Figure 6:
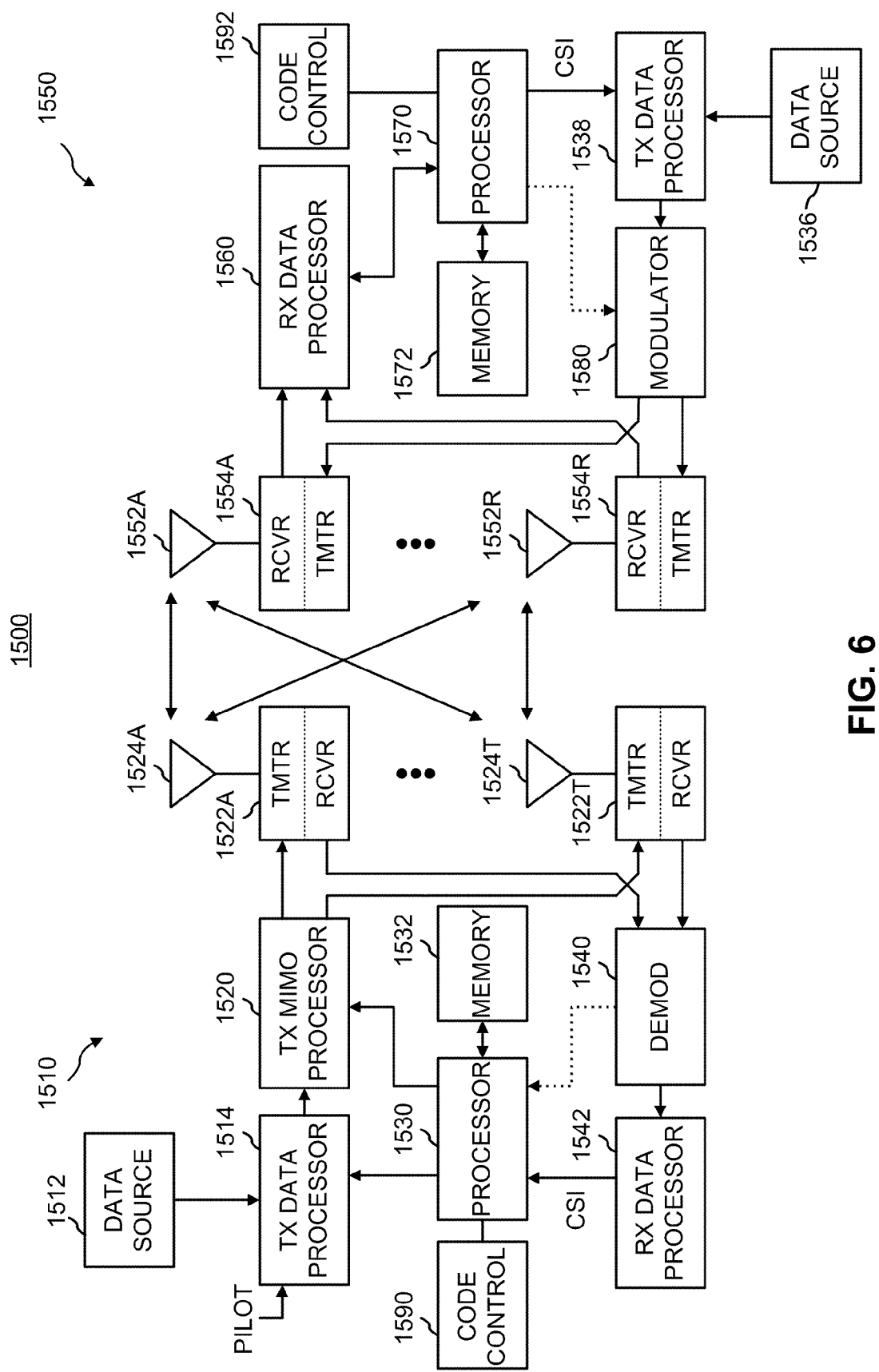
FIG. 6 depicts several sample components that may be employed to facilitate communication between nodes.

FIG. 6 depicts several sample components that may be employed to facilitate communication between nodes. Specifically, FIG. 6 illustrates a wireless device 1510 (e.g., an access point) and a wireless device 1550 (e.g., an access terminal) of a MIMO system 1500. At the access point 1510, traffic data for a number of data streams is provided from a data source 1512 to a transmit (TX) data processor 1514.

In some aspects, each data stream is transmitted over a respective transmit antenna. The TX data processor 1514 formats, codes, and interleaves the traffic data for each data stream based on a particular coding scheme selected for that data stream to provide coded data.

The coded data for each data stream may be multiplexed with pilot data using Orthogonal Frequency-Division Multiplexing (OFDM) techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme selected for that data stream to provide modulation symbols. As non-limiting examples, some suitable modulation schemes are: Binary Phase-Shift Keying (BPSK), Quadrature Phase-Shift Keying (QSPK), Multiple Phase-Shift Keying (M-PSK), and Multi-level Quadrature amplitude modulation (M-QAM).

The data rate, coding, and modulation for each data stream may be determined by instructions performed by a processor 1530. A data memory 1532 may store program code, data, and other information used by the processor 1530 or other components of the access point 1510.

The modulation symbols for all data streams are then provided to a TX MIMO processor 1520, which may further process the modulation symbols (e.g., for OFDM). The TX MIMO processor 1520 then provides NT modulation symbol streams to NT transceivers (XCVR) 1522 (e.g., 1522A through 1522T). In some aspects, the TX MIMO processor 1520 applies beam-forming weights to the symbols of the data streams and to the antenna from which the symbol is being transmitted.

Each transceiver 1522 receives and processes a respective symbol stream to provide one or more analog signals, and further conditions (e.g., amplifies, filters, and upconverts) the analog signals to provide a modulated signal suitable for transmission over the MIMO channel. NT modulated signals from transceivers 1522A through 1522T are then transmitted from corresponding NT antennas 1524 (e.g., 1524A through 1524T).

At the access terminal 1550, the transmitted modulated signals are received by NR antennas 1552 (e.g., 1552A through 1552R) and the received signal from each antenna 1552 is provided to a respective transceiver 1554 (e.g., 1554A through 1554R). Each transceiver 1554 conditions (e.g., filters, amplifies, and downconverts) a respective received signal, digitizes the conditioned signal to provide samples, and further processes the samples to provide a corresponding "received" symbol stream.

A receive (RX) data processor 1560 then receives and processes the NR received symbol streams from NR transceivers 1554 based on a particular receiver processing technique to provide NT "detected" symbol streams. The RX data processor 1560 then demodulates, deinterleaves, and decodes each detected symbol stream to recover the traffic data for the data stream. The processing by the RX data processor 1560 is complementary to that performed by the TX MIMO processor 1520 and the TX data processor 1514 at the access point 1510.

A processor 1570 periodically determines which pre-coding matrix to use (discussed below). The processor 1570 formulates a reverse link message comprising a matrix index portion and a rank value portion. A data memory 1572 may store program code, data, and other information used by the processor 1570 or other components of the access terminal 1550.

The reverse link message may comprise various types of information regarding the communication link and/or the received data stream. The reverse link message is then processed by a TX data processor 1538, which also receives traffic data for a number of data streams from a data source 1536, modulated by a modulator 1580, conditioned by the transceivers 1554A through 1554R, and transmitted through the respective antennas 1552A through 1552R back to the access point 1510.

At the access point 1510, the modulated signals from the access terminal 1550 are received by the antennas 1524, conditioned by the transceivers 1522, demodulated by a demodulator (DEMOD) 1540, and processed by a RX data processor 1542 to extract the reverse link message transmitted by the access terminal 1550. The processor 1530 then determines which pre-coding matrix to use for determining the beam-forming weights then processes the extracted message.

FIG. 6 also illustrates that the communication components may include one or more components that perform transmit power control operations as taught herein. For example, a code control component 1590 may cooperate with the processor 1530 and/or other components of the access point 1510 to send/receive signals to/from another device (e.g., access terminal 1550) as taught herein. Similarly, a code control component 1592 may cooperate with the processor 1570 and/or other components of the access terminal 1550 to send/receive signals to/from another device (e.g., access point 1510). It should be appreciated that for each wireless device 1510 and 1550 the functionality of two or more of the described components may be provided by a single component. For example, a single processing component may provide the functionality of the code control component 1590 and the processor 1530 and a single processing component may provide the functionality of the code control component 1592 and the processor 1570.

An access terminal as discussed herein may be referred to as a mobile station, user equipment, subscriber unit, subscriber station, remote station, remote terminal, user terminal, user agent, or user device. In some implementations such a node may consist of, be implemented within, or include a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem.

Accordingly, one or more aspects taught herein may consist of, be implemented within, or include variety types of apparatuses. Such an apparatus may comprise a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless medium.

As mentioned above, in some aspects a wireless node may comprise an access node (e.g., an access point) for a communication system. Such an access node may provide, for example, connectivity for or to a network (e.g., a wide area network such as the Internet or a cellular network) via a wired or wireless communication link.

Accordingly, the access node may enable another node (e.g., an access terminal) to access the network or some other functionality. In addition, it should be appreciated that one or both of the nodes may be portable or, in some cases, relatively non-portable.

Also, it should be appreciated that a wireless node (e.g., a wireless device) also may be capable of transmitting and/or receiving information in a non-wireless manner via an appropriate communication interface (e.g., via a wired connection).

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

Figure 7:
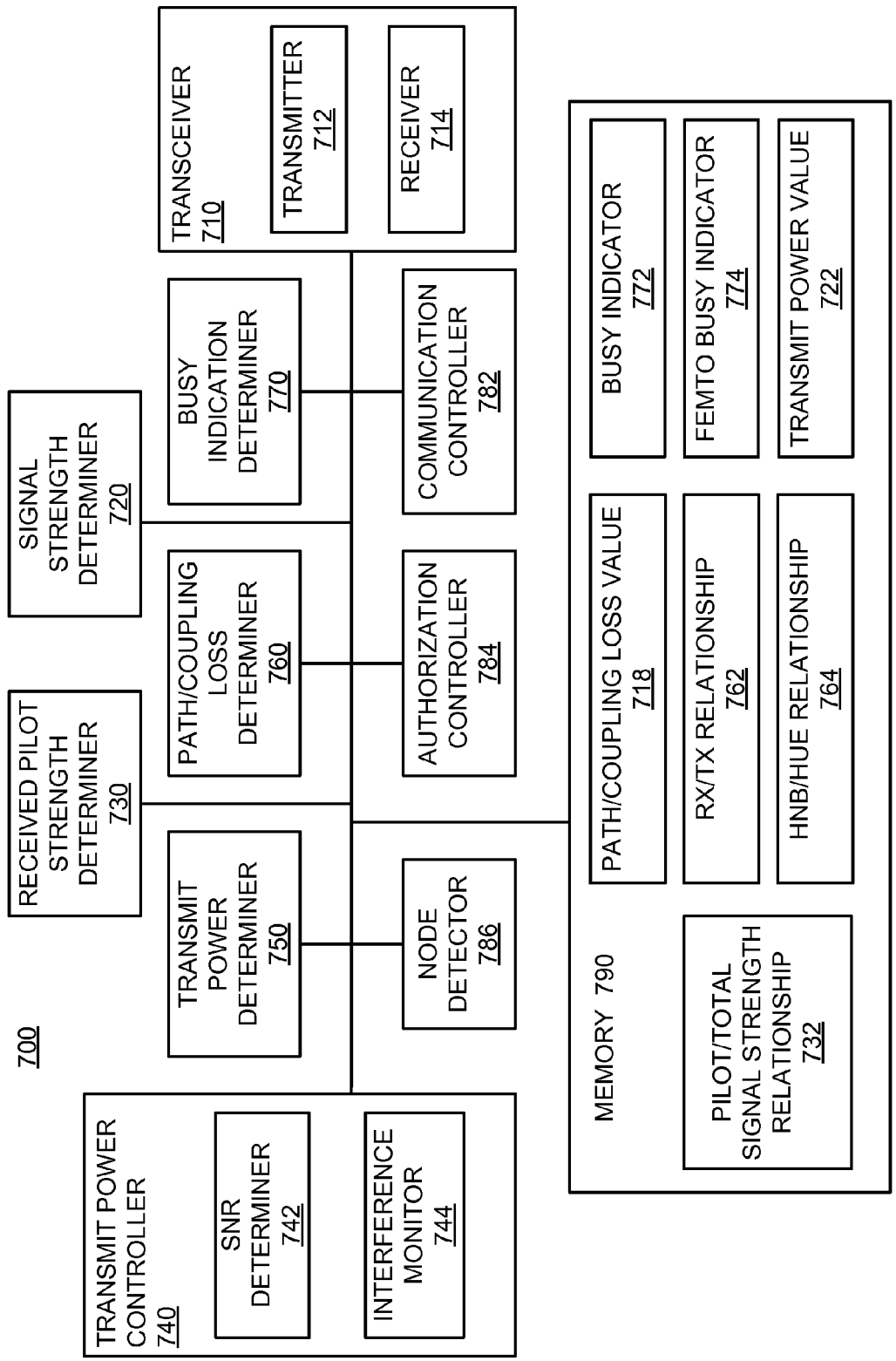
FIG. 7 is a simplified block diagram of several sample aspects of a femto node supporting transmit power selection in user equipment communicating with the femto node.

FIG. 7 illustrates various components of an access node 700 (also referred to herein as a femto node 700) that may be used in one or more implementations as taught herein. It should thus be appreciated that in some implementations a femto node 700 may not incorporate all of the components depicted in FIG. 7 while in other implementations a femto node 700 may employ most or all of the components depicted in FIG. 7.

Briefly, the femto node 700 includes a transceiver 710 for communicating with other nodes (e.g., access terminals). The transceiver 710 includes a transmitter 712 for sending signals and a receiver 714 for receiving signals.

The femto node 700 may also includes a transmit power controller 740 for determining transmit power for the transmitter 712 and a user equipment 520 (FIG. 5) communicating with the femto node 700. The femto node 700 includes a communication controller 782 for managing communications with other nodes and for providing other related functionality as taught herein. The femto node 700 also may include an authorization controller 784 for managing access to other nodes and for providing other related functionality as taught herein. A node detector 786 may determine whether a particular type of node is in a given coverage area.

The transmit power controller 740 may include an interference monitor 744 for monitoring interference on a macrocell which may be caused by user equipment 520 communicating with the femto node 700. The interference may be based on the total received signal strength and the received pilot strength. The transmit power controller 740 also may include a Signal to Noise Ratio (SNR) determiner 742 for determining SNR values associated with the femto node 700.

A signal strength determiner 720 may determine a total received signal strength value (e.g., a received signal strength indication, RSSI). A received pilot strength determiner 730 may determine a signal strength value associated with a pilot signal. A path/coupling loss determiner 760 may determine coupling loss between a HUE and a macrocell in various ways, as are described more fully below.

A transmit power determiner 750 determines an acceptable transmit power that the HUE can use when communicating with the femto node 700 in order to not generate undue interference on the macrocell, as is explained more fully below.

A busy indication determiner 770 may monitor broadcasts from the macrocell that include a busy indicator 772 that can indicate an amount of traffic and interference at the macrocell. The busy indication determiner 770 may also generate a femto busy indicator 774 for communication to the HUE 520 to adjust the transmit power of the HUE 520, as is explained more fully below.

The memory 790 may store many parameters useful in conjunction with operation of some of the functional elements. As non-limiting examples, the memory 790 may include a pilot/total signal strength relationship 732 corresponding to a known or estimated relationship between the pilot strength and the total strength determined by the signal strength determiner 720 and the received pilot strength determiner 730. A path/coupling loss value 718 may be a design parameter that is predefined or may be a value derived by the path/coupling loss determiner 760. A receive/transmit (RX/TX) relationship 762 may be a design parameter that is predefined or may be a derived value indicating a relationship between a downlink path loss at the femto cell 200 and an uplink path loss at the femto cell 200. A HNB/HUE relationship 764 may be a design parameter that is predefined or may be a derived value indicating a relationship between an uplink path loss at the femto cell 700 and an uplink path loss at the HUE 520. A transmit power value 722 may include values indicative of a transmit power in use by the macrocell 560.

Referring to FIGS. 5 and 7, when a HUE 520 is communicating with a femto node 700 it may cause interference with a nearby macrocell base station 560. This interference may be quite high when the HUE 520 is quite far from the femto node 700 such that the HUE 520 has its transmit power adjusted quite high. If the macrocell base station 560 is quite close to the HUE 520 and femto node 700, this interference may be even more pronounced. Embodiments of the present invention, monitor and detect interference at the macrocell base station 560, estimate whether the interference may be caused by the HUE 520 communication with the femto node 700, and adjust the transmit power of the HUE 520 in an attempt to reduce the interference at the macrocell 560.

Under many circumstances, if the path loss from the HUE 520 to the femto node 700 is quite high, for example if they are large distance apart, or obstructions are interfering with communication, the HUE 520 may be handed over from the femto node to the macrocell 560. However, in many circumstances it may be desirable to keep the HUE 520 communicating with the femto node 700 rather than the macrocell 560 whenever possible. As non-limiting examples, a user may have economic advantages in the form of operator fees when using the HUE 520 relative to the macrocell 560. In addition, in order to free up communication bandwidth at the macrocell 560, it may be advisable to keep the HUE 520 communicating with the femto node 700 if the interference level at the macrocell 560 can be managed. Thus, in many circumstances it is advisable to bias communication of the HUE 520 in favor of the femto node 700 rather than the macrocell 560.

Of course, it may not always be advisable to adjust the transmit power of the HUE 520. If the HUE 520 is not causing any interference on the macrocell 560, then it may be advisable to leave the HUE 520 to manage its transmit power based on normal communication with the femto node 700.

Figure 8:
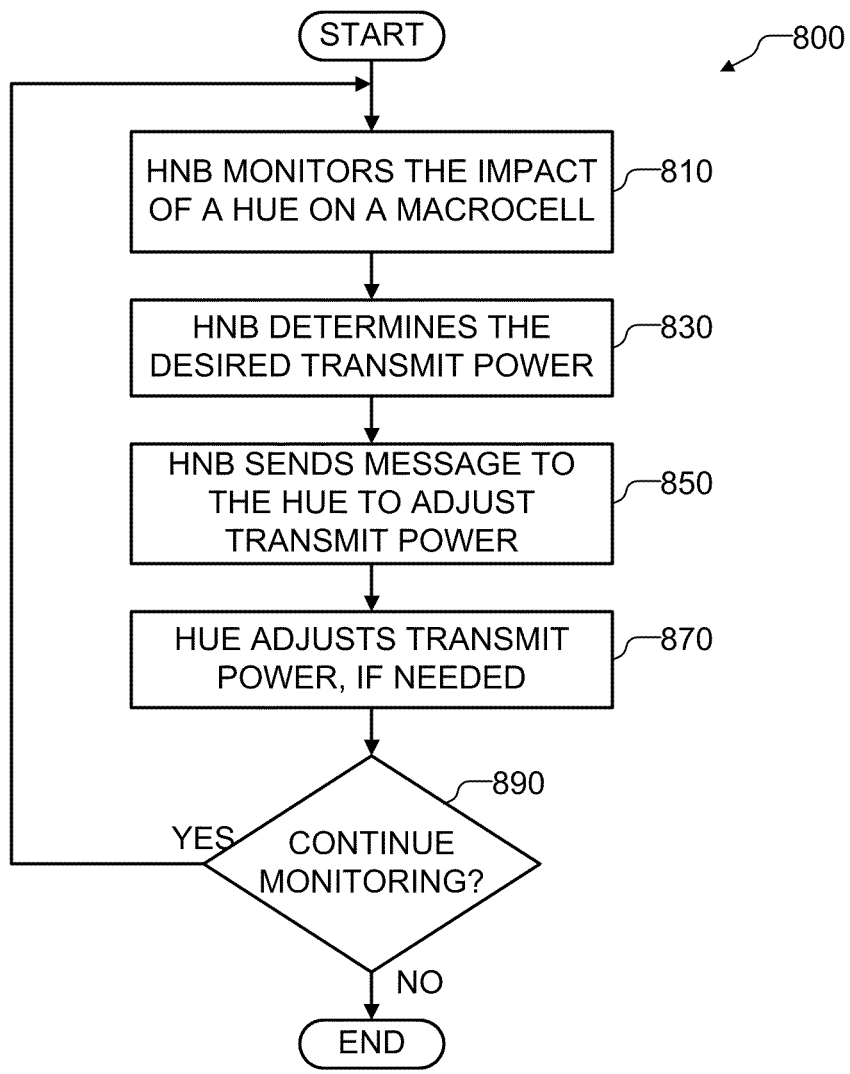
FIG. 8 is a simplified flow diagram of a process for setting transmit power of a user equipment communicating with a femto node.

FIG. 8 is a simplified flow diagram of a process for setting transmit power of a user equipment communicating with a femto node. FIGS. 5, 7, and 8 will be referred to in describing the transmit power setting process 800.

In operation block 810, the femto node 700 (e.g., HNB) monitors the impact that a user equipment 520 (e.g., HUE) may be having on a macrocell 560 while the user equipment 520 is communicating with the femto node 700. This monitoring may take different forms depending on the communication system as is explained below with references to FIGS. 9 and 10. In most cases relating to embodiments of the present invention, the femto node 700 would only want to adjust the transmit power of the user equipment 520 if it is causing interference at the macrocell 560. Therefore, the femto node 700 monitors the macrocell 560 for information that is likely to indicate whether the macrocell 560 is experiencing interference from the user equipment 520.

In operation block 830, the femto node 700 determines the desired transmit power for the user equipment 520 that will likely reduce the interference that the user equipment 520 is causing at the macrocell 560.

In operation block 850, the femto node 700 sends a message to the user equipment 520 indicating how the transmit power of the user equipment 520 should be adjusted. In operation block 870, the user equipment 520 adjusts its transmit power if told to do so from the communication in operation block 850.

Of course, the transmit power of the user equipment 520 does not always have to be reduced. For example, if at some point in time the femto node 700 determines that interference with a visiting access terminal is unlikely, the femto node 700 may decide to direct the user equipment 520 to increase its transmit power.

Decision block 890 indicates that, if desired, the process may be continued while the communication between the user equipment 520 and the femto node 700 is active in an effort to further reduce the interference at the macrocell 560 by further adjustments to the transmit power of the user equipment 520. Thus, the loop creates a feedback system wherein the transmit power of the user equipment 520 can be periodically adjusted to minimize interference with the macrocell 560 while still maintaining adequate transmit power to communicate with the femto node 700.

Figure 9:
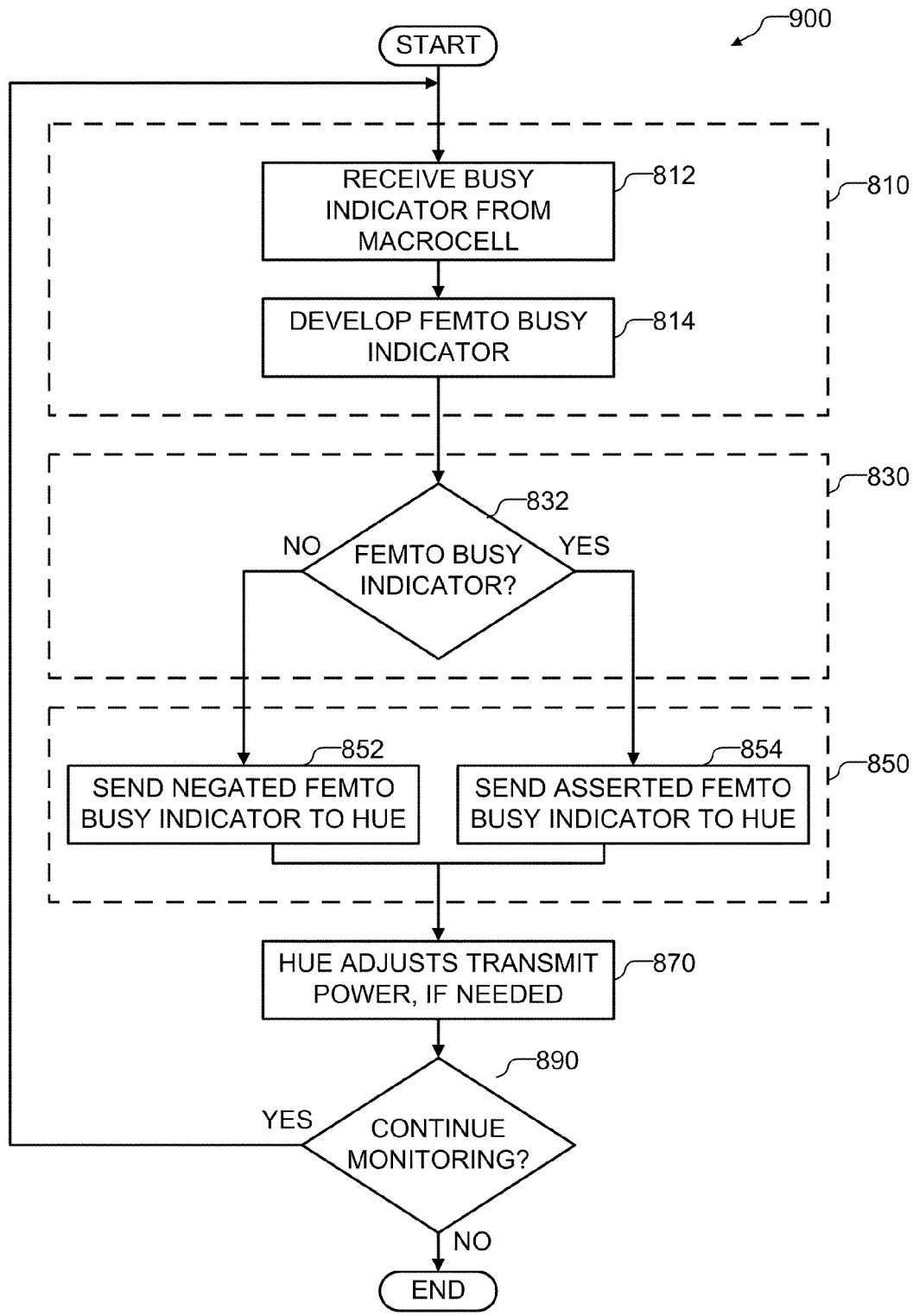
FIG. 9 is a more detailed flow diagram of a process for setting transmit power of a user equipment communicating with a femto node by monitoring a busy indicator from the macrocell.

FIG. 9 is a more detailed flow diagram of a process 900 for setting transmit power of a user equipment communicating with a femto node by monitoring a busy indicator from the macrocell. FIGS. 5, 7, 8, and 9 will be referred to in describing the busy indicator process 900 for adjusting transmit power of the user equipment 520. In describing the process of FIG. 9, the blocks shown as dashed lines correspond to the operation blocks with the same designator as in FIG. 8. Thus, FIG. 9 show additional detail for the operations of FIG. 8, wherein the additional details correspond to the busy indicator process 900.

In some systems (e.g., CDMA 2000), the macrocell 560 periodically transmits a busy indicator. The overall level of interference is tracked by the macrocell 560 of the access network. The access network is configured to determine whether the overall level of interference is above or below a threshold value. If the interference level is below the threshold, indicating a low level of activity, the access network negates a "busy bit" (also may be referred to herein as a busy indicator). If the interference level is above the threshold, indicating a high level of activity, the access network asserts the busy indicator. The busy indicator is then broadcast to all of the access terminals within range to inform them of the level of activity/interference in the system.

Thus, as indicated by operation block 812, some embodiments of the present invention use the busy indication determiner 770 to monitor the busy indicator from the macrocell 560 and store its value, or a history of values, in the memory 790 as a busy indicator 772. It should be noted that for purposes of embodiments of the present invention, the femto node 700 is typically only monitoring the busy indicator as a proxy for determining whether the user equipment 520 is causing interference at the macrocell 560. In addition, the femto node 700 correlate the busy indicator 772 with the transmit power of the user equipment 520 in order to perform an analysis of whether the busy indicator 772 may be set due to the user equipment 520 or not.

In operation block 814, the busy indication determiner 770, uses the busy indicator 772 from the macrocell 560, possible past busy indicators 772, and possibly the transmit power of the user equipment 520 to develop a femto busy indicator 774.

Rather than indicating a busy level between the femto node 700 and the user equipment 520, the femto busy indicator 774 will be used to adjust the transmit power of the user equipment 520.

In its simplest form, the femto busy indicator 774 may simply reflect the value of the busy indicator 772 from the macrocell. However, the busy indicator 772 may be communicated at every time slot. Thus, for every slot, the femto node 700 can decode the busy indicator 772 and, in some embodiments develop a temporally filtered version of the busy indicator 772. The filter may include a relatively small time constant to only include busy indicators 772 from a few time slots. Alternatively, the time constant may be relatively large to include busy indicators 772 from many time slots.

In other embodiments, the femto node 700 can monitor the busy indicator 772 while the user equipment 520 is inactive (e.g., prior to initiating communication with the femto node 700) and when the user equipment 520 is active (e.g., during communication with the femto node 700). If the busy indicator 772 is inactive when the user equipment 520 is inactive and active when the user equipment 520 is active, the femto node 700 may conclude that the change in the busy indicator 772 was caused by the user equipment 520. As a result, the femto node would assert the femto busy indicator 774.

Decision block 832 tests the current value of the femto busy indicator 774 to determine what the femto node 700 should communicate to the user equipment 520.

If the femto busy indicator 774 is asserted, then, according to block 854, the femto node 700 sends an asserted version of the femto busy indicator 774 to the user equipment 520. If, on the other hand, the femto busy indicator 774 is negated, then, according to block 854, the femto node 700 sends a negated version of the femto busy indicator 774 to the user equipment 520, or sends not femto busy indicator 774 at all.

In operation block 870, the user equipment 520 receives and decodes the femto busy indicator 774 as a conventional busy indicator, and responds by reducing or increasing its transmit power as it conventionally would if it received a busy indicator from a macrocell 560 while communicating with the macrocell 560. As a non-limiting example, one means for adjusting the transmit power of the user equipments 520 is through reducing or increasing its uplink data rate.

Decision block 890 is the same as discussed above to create a feedback system, if desired, to continually adjust the transmit power of the user equipment 520 while communication is active.

Figure 10:
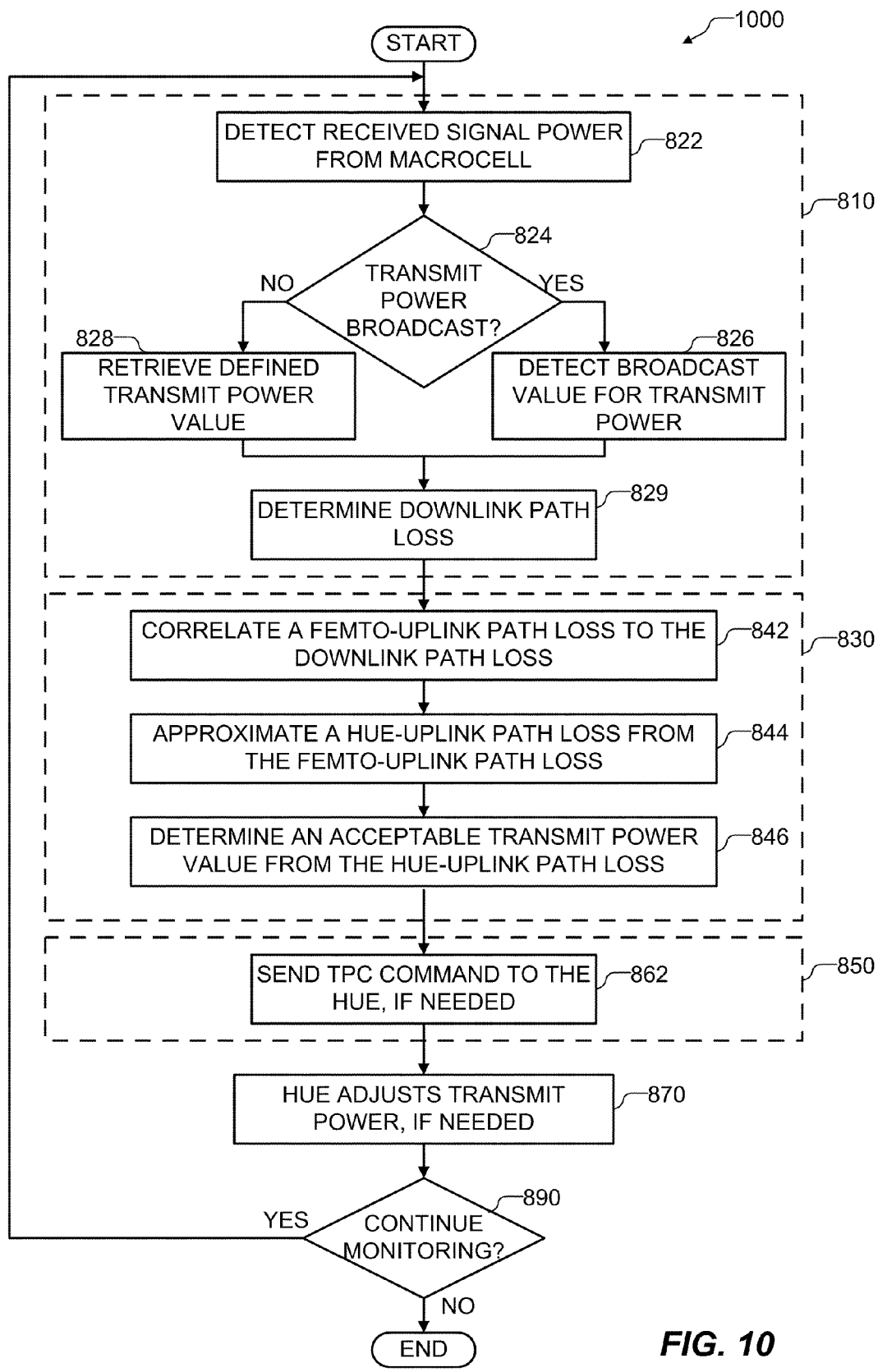
FIG. 10 is a more detailed flow diagram of a process for setting transmit power of a user equipment communicating with a femto node by monitoring received signal power from the macrocell.

FIG. 10 is a more detailed flow diagram of a process 1000 for setting transmit power of a user equipment communicating with a femto node by monitoring received signal power from the macrocell. FIGS. 5, 7, 8, and 10 will be referred to in describing the received signal power process 1000 for adjusting transmit power of the user equipment 520. In describing the process of FIG. 10, the blocks shown as dashed lines correspond to the operation blocks with the same designator as in FIG. 8. Thus, FIG. 10 show additional detail for the operations of FIG. 8, wherein the additional details correspond to the received signal power process 1000.

In process 1000, the femto node 700 monitors signals from the macrocell 560 as a conventional UE would. From this signal monitoring, the femto node can use the interference monitor 744 in combination with the signal strength determiner 720, the pilot strength determiner 730, and the path/coupling loss determiner 760 to estimate the interference that the user equipment 520 is causing on the macrocell 560.

In operation block 822, the femto node 700 detects the received signal power from the macrocell 560. In some embodiments a signal strength determiner 720 may determine a total received signal strength value (e.g., a received signal strength indication, RSSI). In some embodiments a received pilot strength determiner 730 may determine a signal strength value associated with a pilot (e.g., received signal code power, RSCP).

In some systems, the broadcast control channel BCCH carries a repeating pattern of system information messages that describe configuration and available features of the system. These messages may include a current transmit power of the macrocell base station 560.

In decision block 824, the femto node 700 determines whether this broadcast value for current transmit power is available. If so, operation block 826 indicates that the femto cell detects and uses this broadcast value for current transmit power.

If the broadcast value for current transmit power is not available, operation block 828 indicates that the femto node 700 retrieves a transmit power value 722 from the memory 790. This transmit power value 722 may be a preset value of the most likely transmit power for the macrocell or it could be communicated to the femto node 700 by other means, such as, for example, the wide area network 540.

Operation block 829 indicates that the path/coupling loss determiner 760 determines the downlink path loss. The path loss on the downlink that would be experienced at the femto node 700 can be estimated as:

$$PL(dB) = CPICH\_Tx\_Power - Received\ Power \qquad \text{EQUATION 1}$$

Where: CPICH_Tx_Power is the Common Pilot Channel transmit power, whether from the broadcast value or the transmit power value 722 determined through non-broad cast means; and Received power is the determined received signal strength.

The receive signal strength may be measured by the signal strength determiner 720 (e.g., received signal code power, RSCP) or the received pilot strength determiner 730, which may determine a signal strength value associated with a pilot signal as Ecp/Io (e.g., a pilot-to-signal ratio.

The signal strength determiner 720 may determine the signal strength in various ways. For example, in some implementations the femto node 700 measures the signal strength (e.g., the receiver 714 monitors the appropriate channel). In some implementations information relating to the signal strength may be received from another node (e.g., a home access terminal). This information may take the form of, for example, an actual signal strength measurement (e.g., from a node that measured the signal strength) or information that may be used to determine a signal strength value.

In some implementations, the received pilot strength may be estimated from the total received signal strength. This determination may be based on, for example, a known or estimated relationship between the pilot strength and the total strength that is embodied in the form of a pilot/total signal strength relationship 732 (e.g., a function, a table, or a graph) stored in the memory 790. In such an implementation, the signal strength determiner 720 may comprise the received pilot signal strength determiner 730.

Operation block 842 indicates that the interference monitor 744 correlates a femto-uplink path loss with the downlink path loss. This correlation may be approximated based on RX/TX relationship 762 information from the memory 790. Operation block 844 indicates that the interference monitor 744 approximates a user equipment uplink path loss from the femto-uplink path loss using HNB/HUE relationship 764 information from the memory 790. If the user equipment 520 is relatively close to the femto node 700, this approximation will be quite accurate and may diminish in accuracy as the user equipment 520 moves farther away from the femto node 700. As a result, the femto node 700 may add margin into this approximation to account for deviations.

Operation block 846 indicates that the transmit power determiner 750 determines an acceptable transmit power value for the user equipment 520 based on the approximated user equipment uplink path loss. As a non-limiting example, in some systems, the femto node 700 may specifically signal a maximum limit on the total power of the user equipment 520. In other systems, such signaling may not exist. However, the femto node 700 may still limit the data rate of the user equipment 520 by sending a busy indicator or by making the user equipment 520 more conservative when determining the data rate through signaling more conservative Medium Access Control (MAC) parameters.

Thus, the femto node 700 may send an "up" command to instruct the HUE 520 to increase its transmit power or a "down" command to instruct the HUE 520 to decrease its transmit power, or a power level command to set a specific power level.

In operation block 870, the user equipment 520 receives and decodes the TPC command, and responds by reducing or increasing its transmit power as indicated by the TPC command.

Decision block 890 is the same as discussed above to create a feedback system, if desired, to continually adjust the transmit power of the user equipment 520 while communication is active.

Figure 11:
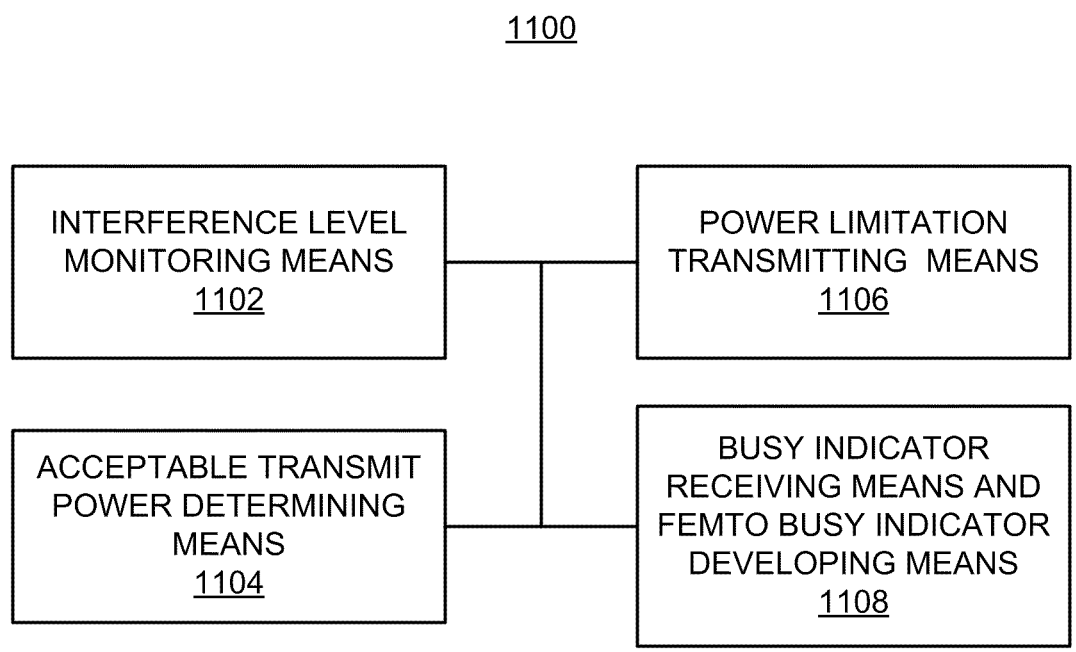
FIG. 11 is a simplified block diagram of several sample aspects of apparatuses configured for setting transmit power of a user equipment communicating with a femto node.

The components described herein may be implemented in a variety of ways. Referring to FIG. 11, apparatus 1100 is represented as a series of interrelated functional blocks. In some aspects the functionality of these blocks may be implemented as a processing system including one or more processor components. In some aspects the functionality of these blocks may be implemented using, for example, at least a portion of one or more integrated circuits (e.g., an ASIC). As discussed herein, an integrated circuit may include a processor, software, other related components, or some combination thereof. The functionality of these blocks also may be implemented in some other manner as taught herein.

The apparatus 1100 may include one or more modules that may perform one or more of the functions described above with regard to various figures. For example, an interference level monitoring means 1102 may correspond to, for example, an interference monitor as discussed herein. An acceptable transmit power determining means 1104 may correspond to, for example, a transmit power determiner as discussed herein. A power limitation transmitting means 1106 may correspond to, for example, a transmitter as discussed herein. A busy indicator receiving means and femto busy indicator developing means 1108 may correspond to, for example, a busy indication determiner as discussed herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A. method of wireless communication, comprising:
   on a femto node;
      monitoring an interference level macrocell base station from a user equipment communicating with the femto node;
      determining an acceptable transmit power for the user equipment responsive to the interference level; and
      transmitting a power limitation from the femto node to the user equipment responsive to the acceptable transmit power.

2. The method of claim 1, wherein:
   monitoring the interference level further comprises:
      receiving a busy indicator from the macrocell base station; and
      developing a femto busy indicator responsive to the busy indicator;
   determining the acceptable transmit power further comprises determining that the acceptable transmit power should be decreased from a current transmit power if the femto busy indicator is asserted; and
   transmitting the power limitation further comprises:
      sending, the femto busy indicator to the user equipment as negated if the acceptable transmit power should be maintained; and
      sending the femto busy indicator to the user equipment as asserted if the acceptable transmit power should be decreased.

3. The method of claim 1, wherein:
   monitoring the interference level further comprises:
      detecting a received signal power from the macrocell base station;
      determining a transmitted signal power from the macrocell base station; and
      evaluating the transmitted signal power and the received signal power to determine a downlink path loss;
   determining the acceptable transmit power further comprises:
      approximating an uplink path loss from the User equipment to the macrocell base station responsive to the downlink path loss; and determining the acceptable transmit power responsive to the downlink path loss; and transmitting the power limitation comprises transmitting the acceptable transmit power.

4. The method of claim 3, wherein the transmitted signal power is determined from a broadcast message received from the macrocell, base station.

5. The method of claim 3, comprising wherein the transmitted signal power is determined from a preset value or a value received through a wide area network.

6. The method of claim 3, wherein approximating the uplink path loss comprises:
correlating a femto-uplink path loss to the downlink path loss; and
approximating the uplink path loss responsive to the femto-uplink path loss.

7. The method of claim 1, further comprising repeating the acts of monitoring the interference level, determining the acceptable transmit power, transmitting the acceptable transmit power, and adjusting the transmit power to further refine the transmit power of the user equipment.

8. A femto node, comprising:
a busy indication determiner for detecting a busy indicator from a macrocell base station proximate a wireless communications apparatus and developing a femto busy indicator responsive to the busy indicator; and
a communication controller,for sending the femto busy indicator to a user equipment in communication with the femto node.

9. The femto node of claim 8, wherein the busy indication determiner is further for developing the femto busy indicator by temporally filtering a plurality of busy indicators received from the macrocell base station.

10. The femto node of claim 8, wherein the busy indication determiner is further for:
detecting a prior busy indicator from the macrocell base station prior to a communication link between the femto node and the user equipment;
detecting a current busy indicator from the macrocell base station during the communication link;
negating the femto busy indicator if the current busy indicator is negated; and
asserting the femto busy indicator if the prior busy indicator is negated and the current busy indicator is asserted.

11. A femto node, comprising:
a signal strength determiner for measuring a received signal power from a macrocell base station proximate the femto node;
path loss determiner for calculating a downlink path loss at the femto node;
an interference monitor for correlating an up link path loss at a user equipment in communication with the femto node from the downlink path loss at the femto node;
transmit power determiner for establishing an acceptable transmit power forthe user equipment responsive to the up link path loss at the user equipment; and
a communication controller for sending the acceptable transmit power to the user equipment.

12. The femto node of claim 11, wherein the path loss determiner calculates the downlink path loss by:
decoding a broadcast value of a current transmit power from The macrocell base station; and
subtracting the received signal power from the current transmit power.

13. The femto node of claim 11, wherein the path loss determiner calculates the downlink path loss by:
estimating a current transmit power from the macrocell base station from at least one of a predetermined value and a value received from a communication through a wide area network; and
subtracting the received signal power from the current transmit power.

14. The femto node of claim 11, wherein the path loss determiner is further for:
correlating a femto-uplink path loss to the downlink path loss at the femto node; and
approximating the uplink path loss at the user equipment responsive to the femto-uplink path loss.

15. The femto node of claim 11, wherein the communication controller sends the acceptable transmit power to the user equipment as a limit on the transmit power, a limit on a data rate, or a combination thereof.

16. A femto node, comprising:
means for monitoring, an:interference level to a macrocell base station from a user equipment communicating with the femto node;
means for determining an acceptable transmit power for the user equipment responsive to the interference level; and
means for transmitting a power limitation from the femto node to the user equipment responsive to the, acceptable transmit power.

17. The femto node of claim 16, wherein:
the means for monitoring the interference level further comprises:
means for receiving a busy indicator from the macrocell base station; and
means for developing a femto busy indicator responsive to the busy indicator;
the means for determining the acceptable transmit power further comprises means for determining that the acceptable transmit power should be decreased from a current transmit power if the femto busy indicatoris asserted; and
the means for transmitting the power limitation further comprises:
means for sending the femto busy indicator to the user equipment as negated if the acceptable transmit power should be maintained; and
means for sending the femto busy indicator to the user equipment as asserted if the acceptable transmit power should be decreased.

18. The femto node of claim 16, wherein:
the means for monitoring the interference level further comprises:
means for detecting a received signal power from the macrocell base station;
means for determining a transmitted signal power from the macrocell base station; and
means for evaluating the transmitted signal power and the received signal power to determine a downlink path loss;
the means for determining the acceptable transmit power further comprises:
means for approximating an uplink path loss from the user equipment to the macrocell base station responsive to the downlink path loss; and
means for determining the acceptable transmit power responsive to the downlink path loss; and
the means for transmitting the power limitation comprises transmitting the acceptable transmit power.

19. The femto node of claim 18, wherein the transmitted signal power is determined from a broadcast message received from the macrocell base station.

20. The femto node of claim 18, comprising wherein the transmitted signal power is determined from a preset value or a value received through a wide area network.

21. The femto node of claim 18, Wherein the means for approximating the uplink path loss comprises:
   means for correlating a femto-uplink path loss to the downlink path loss; and
   means for approximating the uplink path loss responsive to the femto uplink path loss.

22. A computer program product, comprising:
   a non-transitory computer-readable medium comprising codes for causing a computer to:
   monitor an interference level to a macrocell base station from a user equipment communicating with a femto node;
   determine an acceptable transmit power for the user equipment responsive to the interference level; and
   transmit a power limitation from the femto node to the user equipment responsive to the acceptable transmit power.

23. The computer program product of claim 22, wherein:
   the codes for causing the computer to monitor the interference level futiher cause the computer to:
      receive a busy indicator from the macrocell base station; and
      develop a femto busy indicator responsive to the busy indicator;
   the codes for causing the computer to determine the acceptable transmit power further cause the computer to determine that the acceptable transmit power should be decreased from a current transmit power if the femto busy indicator is asserted; and
   the codes for causing the computer to transmit the power limitation further cause the computer to:
      send the femto busy indicator to the user equipment as negated if the acceptable transmit power should be maintained; and
      send the femto busy indicator to the user equipment as asserted if the acceptable transmit power should be decreased.

24. The computer program product of claim 22, wherein:.
   the codes for causing the computer to monitor the interference level further cause the computer to:
      detect a received signal power from the macrocell base station;
      determine a transmitted signal power from the macrocell base station; and
      evaluate the transmitted, signal power and the received signal power to determine a downlink path loss;
   the codes for causing the computer to determining the acceptable transmit power further cause the computer to:
      approximate an uplink path loss from the user equipment to the macrocell base station responsive to the downlink path loss; and
      determine the acceptable transmit power responsive to the downlink path loss; and
   the codes for causing the computer to transmit the power limitation further cause the computer to transmit the acceptable transmit power.

25. The computer program product of claim 24, wherein the codes for causing the computer to approximate the uplink path loss further cause the computer to:
   correlate a femto-uplink path loss to the downlink path loss; and
   approximate the uplink path loss responsive to the femto uplink path loss.

\* \* \* \* \*